(No Model.) 4 Sheets—Sheet 1.

E. BECKER.
CHAIN.

No. 556,730. Patented Mar. 24, 1896.

Witnesses:
Max Hausmann
Horatio B. Bowerman

Inventor:
Edmund Becker (No Model.) 4 Sheets—Sheet 2.
E. BECKER.
CHAIN.
No. 556,730. Patented Mar. 24, 1896.
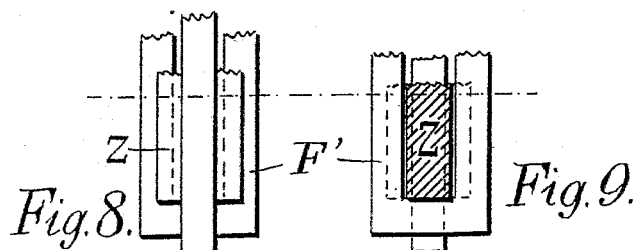
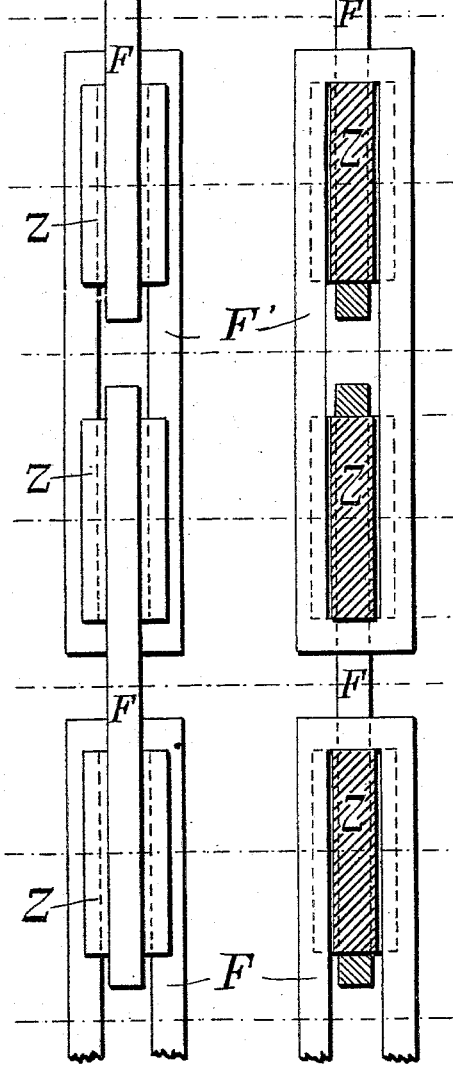
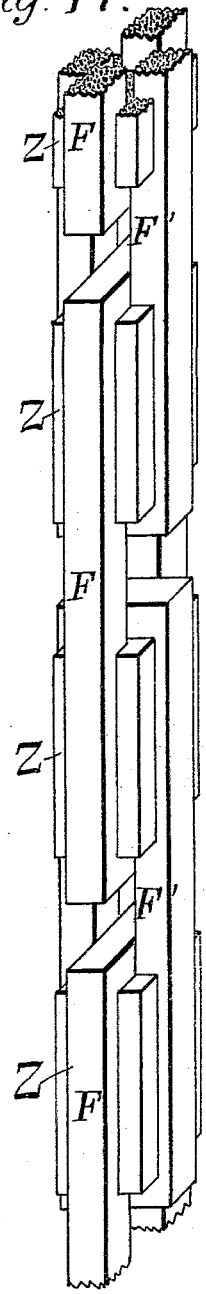
Witnesses:
Max Hanemann
Horatio B. Bowerman
Inventor:
Edmund Becker (No Model.) 4 Sheets—Sheet 3.
E. BECKER.
CHAIN.
No. 556,730. Patented Mar. 24, 1896.
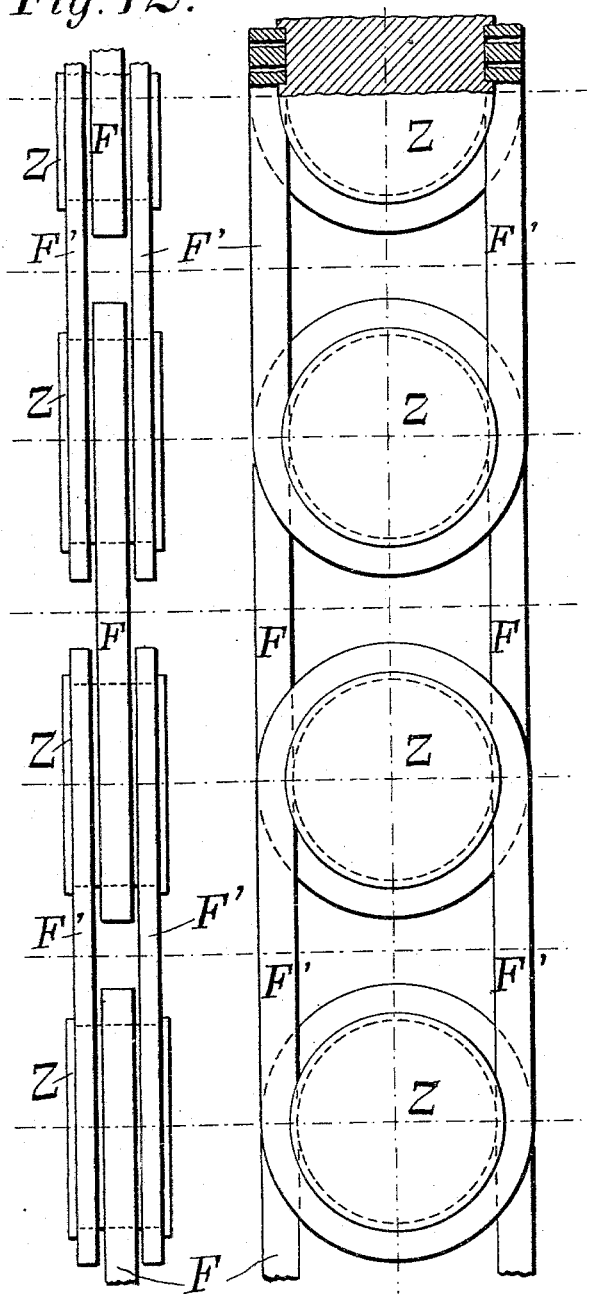
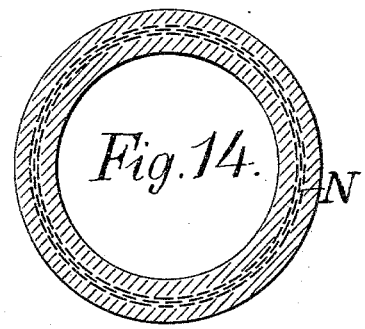
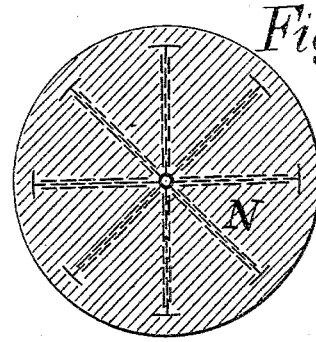
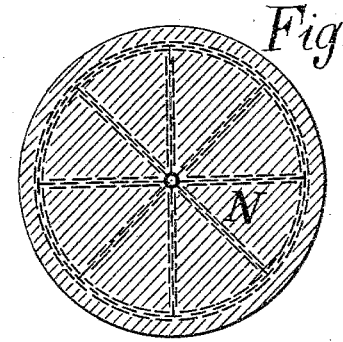
Witnesses:
Max Hausmann
Horatio B. Bowerman
Inventor:
Edmund Becker (No Model.) 4 Sheets—Sheet 4.

E. BECKER.
CHAIN.

No. 556,730. Patented Mar. 24, 1896.

Witnesses:
Max Hausmann
Horatio B. Bowerman

Inventor:
Edmund Becker

UNITED STATES PATENT OFFICE.

EDMUND BECKER, OF WASHINGTON, DISTRICT OF COLUMBIA.

CHAIN.

SPECIFICATION forming part of Letters Patent No. 556,730, dated March 24, 1896.

Application filed June 6, 1893. Serial No. 476,758. (No model.)

*To all whom it may concern:*

Be it known that I, EDMUND BECKER, a citizen of the United States, residing at Washington, District of Columbia, have invented a new and useful Chain, the length of which is not affected by changes in temperature—in other words, my chain has "zero" for coefficient of dilatation—of which the following is a specification.

Its main feature consists in that each link is separated from the adjoining ones by plugs of a material having a coefficient of dilatation greater than that of the material of which the links are made.

Dilatation and contraction have always been a source of anxiety for constructers. The binding of the bases of large cupolas or domes, the anchoring to the bottom of high walls, the staying of bridge or other piers, the use of low arches, and the fixing of distances between floor-beams, have been so many problems which have been solved only by the use of wood-binding, both perishable and unreliable, or by an enormous increase of masonry or buttressing. In most cases dilatation is considered as an unavoidable evil, which hastens the ruin of structures, and under great changes of temperature actually causes their overthrow.

My method, giving the means of building a chain having a coefficient of dilatation zero, also permits me to make one of any coefficient of dilatation inferior to that of the material of the chain-links, and a chain retractible by heat will to a certain extent be possible. Whenever embedded in a material the chain shall be made of the same coefficient of dilatation as that of the ambient material.

My invention is illustrated by the accompanying drawings, in which—

Figure 1:
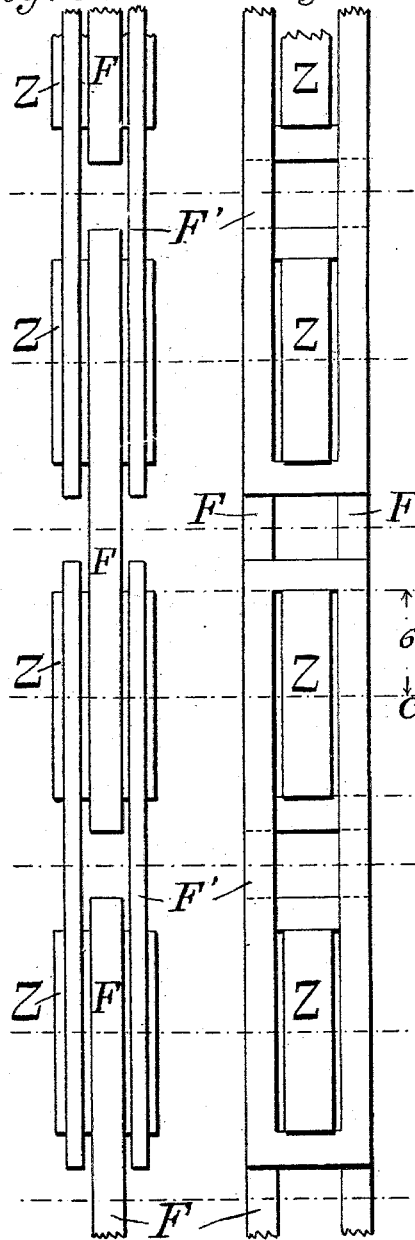
Figure 2:
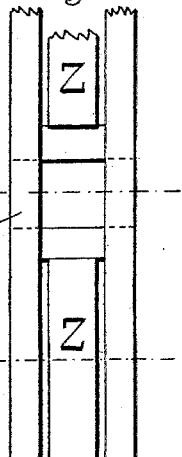
Figures 4, 5:
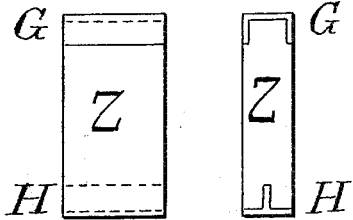
Figure 3:
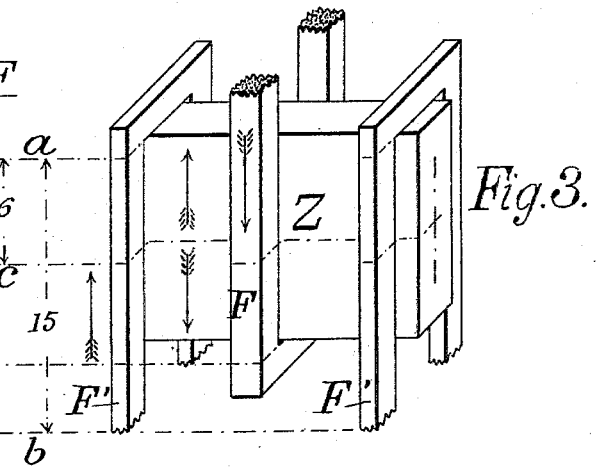
Figure 6:
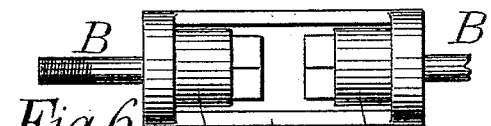
Figure 7:
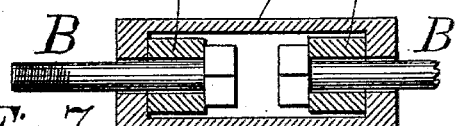

Figures 1 to 3 show a nearly-rigid chain with links in planes parallel to each other. Figs. 4 and 5 show a plug armored at ends. Figs. 6 and 7 show a chain of links and bolts. Figs. 8 to 11 show a chain nearly rigid with links in planes crossing each other at right angles. Figs. 12 and 13 show a chain like that of Figs. 1 to 3, but capable of assuming plane curves. In the above figures the links are marked F and F' and the expansible plugs Z. Figs. 14 to 21 show some applications of the chain to various structures. In these applications the chain is marked N.

Considering Figs. 1 to 3, where Fig. 3 shows the plug sufficiently widened to separate the links and show clearly the theory of my method, let $a\,b$ be the length of one-half of the opening of a link F' and $c$ the center of plug Z. If we give to Z a proportion such that the dilatation of $c\,a$ equals the dilatation of $a\,b$, the distance $c\,b$ shall not change, and this being repeated for each half-link of the chain the length of the latter shall remain constant.

For each degree Fahrenheit the coefficient of dilatation of iron is one one-hundred-and-forty-nine thousandth, and that of zinc is one sixty-two thousandth. As the ratio of these coefficients is then nearly six-fifteenths, iron links with holes thirty units long, said holes contracting and expanding like blocks of the same length which would fill them, and zinc plugs twelve units long will solve the problem—i. e., they will give a chain having a constant length for all temperatures and also when not uniformly heated.

To apply my method to any combinations of substances, and calling F one-half of the length of the opening of the link and Z one-half of the height of the plug of the more expansible material, $f$ the coefficient of dilatation of F, $z$ the coefficient of dilatation of Z, $k$ the effective coefficient of dilatation of the whole chain, we have the following formulæ from which F, Z or $k$ can be calculated, the others being known:

$$F=\frac{Z\,z - Z\,k}{f-k}. \quad Z=\frac{F\,f - F\,k}{z-k}. \quad k=\frac{F\,f - Z\,z}{F-Z}.$$

Assuming the coefficients to be for iron one one-hundred-and-fifty-thousandth, for brass one one-hundred-thousandth, and for zinc one sixty-thousandth, we shall have the following table, in which to facilitate comparison Z is made a constant:

| $k$. | $Z$. | | $F$. |
|---|---|---|---|
| 0 | 12 zinc | | 30 iron. |
| $\frac{1}{300000}$ | 12 zinc | | 48 iron. |
| $\frac{1}{250000}$ | 12 zinc | | 57 iron. |
| $\frac{1}{250000}$ | | 12 brass | 27 iron. |
| $\frac{1}{200000}$ | 12 zinc | | 84 iron. |
| $\frac{1}{200000}$ | | 12 brass | 36 iron. |

For a chain contractible by heat $k$ is negative, so that a chain having a coefficient of contraction of one three-hundred-and-fifty-thousandth per degree Fahrenheit must have thirty for opening of iron link and fourteen and twenty-six forty-firsts for height of zinc plug. In this chain the link cannot be thicker than one-third, for, as seen in Fig. 1, for instance, the opening in the link F must in length be equal to at least the sum of two plugs Z and two thicknesses of the link F at their highest temperature. When the formulæ give proportions not satisfying this condition the problem is impossible. The width and thickness, as well as the opening of the link, will be chosen so that the resistance to crushing of the compensating plug will be equal to the tensile strength of the link.

Figs. 4 and 5 show a channel-guard G and T-guard H, which distribute the stress over the whole end surface of the plug Z and prevent its wearing, thereby saving on the weight of the plug and the price of the chain. For the chain of Figs. 12 and 13 a guard of sheet-steel would be used.

I intend in practice to make the chain by casting the expansible plugs between the links, these being first properly and equally spaced, but for physical researches a built-up chain may be more accurate.

Fig. 6 is an elevation, and Fig. 7 a section, of a modified form of my invention, in which the alternate links take the shape of bolt B, passing through the plug $Z^2$ and the enlarged ends of the links proper, $F^2$.

The chains of Figs. 1 to 11 having rectangular plugs are nearly rigid, but the form shown in Figs. 12 and 13, with the plugs Z in the shape of cylindrical pins, can assume any amount of curvature in one plane.

The plug Z is considered tight in the link at the highest temperature.

A chain of a lower coefficient could be made more expansible by the mere addition of links of an ordinary chain or the addition of a certain length of a bar, but it would not fulfill the object where the chain may be of different temperatures at different parts of its length.

Figure 17:
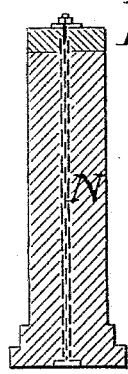
Figure 18:
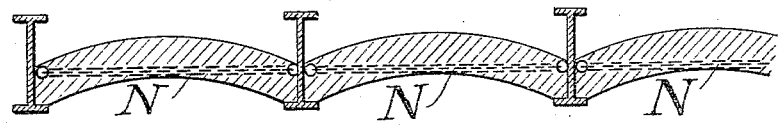
Figure 21:
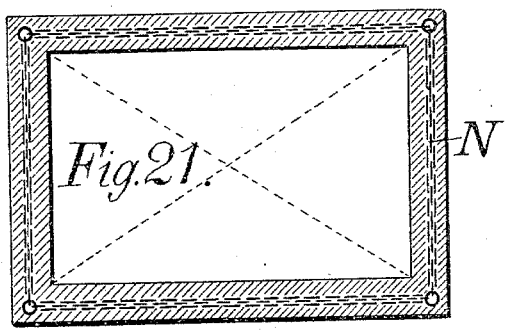

Fig. 14 shows the chain N embedded in a cylindrical wall; Fig. 21, the same in a wall of a rectangular plan; Fig. 15, a radial anchoring of a solid cylinder; Fig. 16, a radial anchoring combined with a circular binding of a solid cylinder; Fig. 17, the anchoring of a top plate to the bottom of a wall, specially useful for machinery foundations; Fig. 18, the binding of the iron beams of a fireproof floor.

In all the above the chain shall have the same coefficient of dilatation as the wall in which it is embedded.

Figures 19, 20:
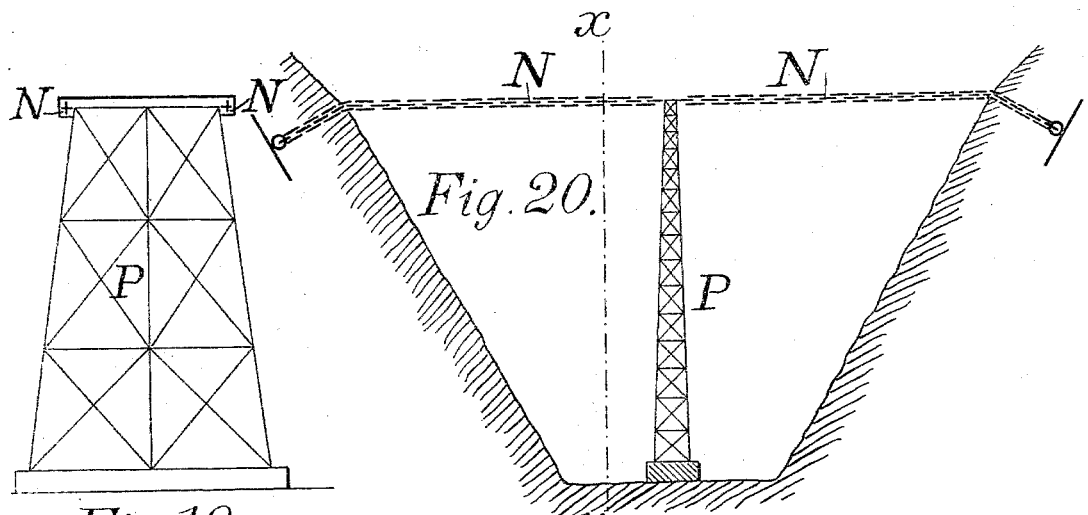

Fig. 19 is a section on line $x\,y$ of Fig. 20.

In Fig. 20 the chain is used to brace pier P. The bridge is supposed to be fixed at its middle point to P and to have freedom of motion at its ends to allow for expansion and contraction. Fig. 19 shows the chain supported on the bridge to prevent sagging. In this last application the chain shall have a coefficient of dilatation 0.

What I claim as my invention, and desire to secure by Letters Patent, is—

1. A chain composed of links and plugs between the links, said plugs and links being of different materials having different coefficients of expansion, for the purpose set forth.

2. A chain provided between its links with plugs having for any rise in temperature an aggregate expansion equal to the corresponding aggregate expansion of the link-openings.

3. A chain having in each link a plug partly filling the link-opening, the expansion of the plug for any rise in temperature bearing a certain given ratio to the corresponding expansion of the link-opening.

4. A chain having in each link a plug partly filling the link-opening, the expansion of the plug for any rise in temperature being equal to the corresponding expansion of the link-opening so that the free space between the plug and link shall remain invariable at all temperatures.

5. A chain having in each link a plug whose expansion for any given rise in temperature bears a certain given relation to that of the link-opening.

6. A chain composed of steel links separated by zinc plugs.

7. A chain consisting of links connected by transverse cylindrical pins of a different material the diametrical expansion of each pin bearing a certain given ratio to the expansion of the link length, substantially as described.

8. A chain consisting of links connected by transverse cylindrical pins of different material, the diametrical expansion of each pin being equal to the expansion of the link as measured between the extreme edges of the pin-openings.

9. In combination with a chain for binding or anchoring structures, means for varying its coefficient of expansion to make it correspond with that of the structure.

10. A masonry structure having embedded therein a metallic chain having substantially the same coefficient of expansion as said structure.

11. In combination with a masonry structure, an anchoring or binding chain provided with means for varying its coefficient of expansion, substantially as described.

12. In combination with a structure, a binding or anchoring chain having zero for its coefficient of expansion.

13. The combination of links and plugs the plugs being provided with guards for distributing the pressure, throughout the mass of the plugs these being generally of a softer material.

14. The combination in a structure with a chain consisting of links and plugs of a different material of means for supporting the chain throughout its length substantially as described.

EDMUND BECKER.

Witnesses:
 MAX HANSMANN,
 HORATIO B. BOWERMAN.